United States Patent
Knowles

(10) Patent No.: US 7,685,579 B2
(45) Date of Patent: Mar. 23, 2010

(54) METHOD AND APPARATUS FOR PERFORMING ADJUSTABLE PRECISION EXCEPTION HANDLING

(75) Inventor: Paul Thomas Knowles, Manchester (GB)

(73) Assignee: International Business Machines Corporation, Armonk, NY (US)

(*) Notice: Subject to any disclaimer, the term of this patent is extended or adjusted under 35 U.S.C. 154(b) by 1137 days.

(21) Appl. No.: 10/726,857

(22) Filed: Dec. 2, 2003

(65) Prior Publication Data
US 2005/0005265 A1   Jan. 6, 2005

(30) Foreign Application Priority Data
Jul. 4, 2003  (GB) ................... 0315844.1
Oct. 1, 2003  (GB) ................... 0322953.1

(51) Int. Cl.
*G06F 9/45* (2006.01)
(52) U.S. Cl. ............... 717/140; 717/136; 717/137; 717/138; 717/139
(58) Field of Classification Search ............... 717/124, 717/136–140
See application file for complete search history.

(56) References Cited

U.S. PATENT DOCUMENTS

| | | | |
|---|---|---|---|
| 5,764,962 A * | 6/1998 | Buzbee ................. | 703/23 |
| 5,958,061 A | 9/1999 | Kelly et al. | |
| 6,131,187 A | 10/2000 | Chow et al. | |
| 6,219,832 B1 * | 4/2001 | Buzbee ................. | 717/153 |
| 7,003,762 B2 * | 2/2006 | Krueger ................. | 717/126 |
| 2001/0013118 A1 * | 8/2001 | Krishnaswamy ........ | 717/5 |
| 2001/0052065 A1 | 12/2001 | Alexander, III et al. | |
| 2002/0092002 A1 * | 7/2002 | Babaian et al. ......... | 717/137 |
| 2003/0126419 A1 * | 7/2003 | Gao et al. .............. | 712/244 |
| 2004/0128658 A1 * | 7/2004 | Lueh et al. ............. | 717/151 |
| 2004/0255279 A1 | 12/2004 | Rawsthorne et al. | |

FOREIGN PATENT DOCUMENTS

| | | |
|---|---|---|
| EP | 0 790 556 A3 | 8/1997 |
| WO | WO-9914671 | 3/1999 |
| WO | WO 00/65440 A | 11/2000 |
| WO | WO-0163416 | 8/2001 |

OTHER PUBLICATIONS

"Porting software from an MC68040 to an MC68060", Freescale Semiconductor, Inc. by Gokingco et al., Apr. 6, 1995.*
Gokingco "Porting software from an MC68040 to an MC68060", Apr. 6, 1995, Freescale Semiconductor Inc.*
Rudd "Efficient Exception Handling Techniques for High-Performance Processor Architectures", Aug. 1997, Stanford University.*
Gokingco et al., "Porting software from an MC68040 to an MC68060", Apr. 6, 1995, Freescale Semiconductor, Inc.*

* cited by examiner

*Primary Examiner*—Wei Y Zhen
*Assistant Examiner*—Junchun Wu
(74) *Attorney, Agent, or Firm*—Matthew B. Talpis

(57) ABSTRACT

An adjustable precision exception handling technique is providing for handling exceptions encountered during translation of subject code to target code at varying levels of precision, depending upon the particular type of exception encountered. As an exception signal is detected by the translator, the state of the subject processor is captured at a precision determined to be sufficient for the detected exception.

21 Claims, 3 Drawing Sheets

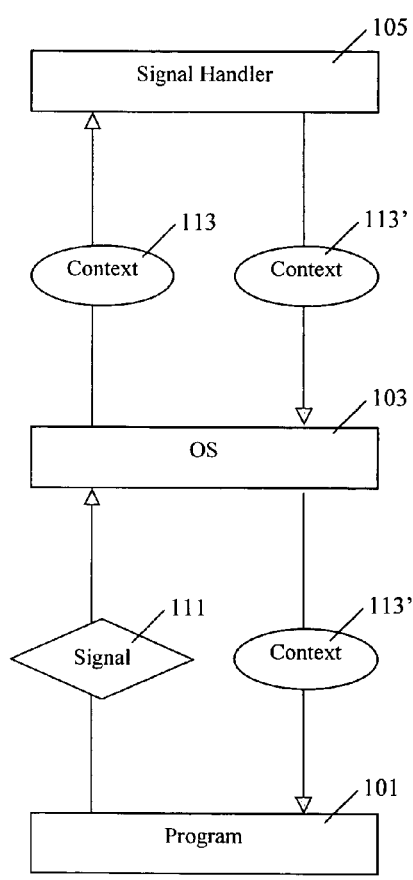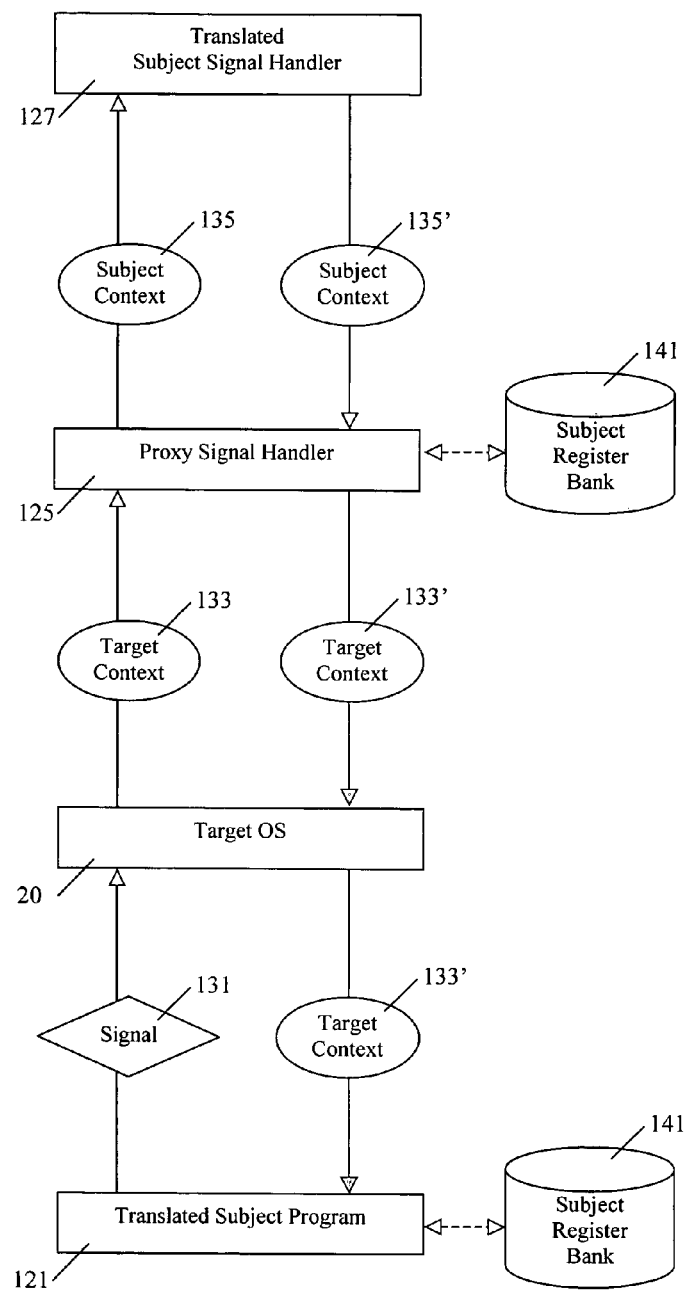
FIG. 2
SUBJECT PROCESSOR
SIGNAL HANDLING
FIG. 3
TRANSLATED
SIGNAL HANDLING
(OS MECHANISM)

SUBJECT PROCESSOR
SIGNAL HANDLING

TRANSLATED
SIGNAL HANDLING
(DIRECT INVOCATION)

METHOD AND APPARATUS FOR PERFORMING ADJUSTABLE PRECISION EXCEPTION HANDLING

BACKGROUND

1. Technical Field

The subject invention relates generally to the field of computers and computer software and, more particularly, to program code conversion methods and apparatus useful, for example, in code translators, emulators and accelerators which encounter exception signals.

2. Description of Related Art

An exception is a condition that changes the normal flow of control in a program. An exception may be generated ("raised") by hardware or software. Hardware exceptions include such signals as resets, interrupts, or signals from a memory management unit. Exceptions may be generated by an arithmetic logic unit or floating-point unit for numerical errors such as divide-by-zero, for overflow or underflow, or for instruction decoding errors such as privileged, reserved, trap or undefined instructions. Software exceptions are varied respectively across various software programs and could be applied to any kind of error checking which alters the normal behavior of the program. An exception handler is special code which is called upon when an exception occurs during the execution of a program. If the program does not provide a handler for a given exception, a default system exception handler will be called, usually resulting in abortion of the program being run and an error indication being returned.

Exception signals are a common mechanism for raising exceptions on many operating systems. The POSIX standard, which is adhered to by many operating systems, particularly Unix-like systems, specifies how this mechanism should behave so that exception signals are broadly similar across many systems. The most common events that trigger exceptions are when a process implemented by a program tries to (i) access an unmapped memory region or (ii) manipulate a memory region for which it does not have the correct permissions. Other common events that trigger exception signals are (iii) the receipt of a signal sent from another process, (iv) the execution by a process of an instruction that the process does not have the privilege level to execute, or (v) an I/O event in the hardware.

Due to the interruption of the program being executed, the delivery of an exception signal by the operating system to an exception handler normally includes a captured state of the subject processor when the exception occurred. This state can be very difficult to determine and costly to generate. In order to avoid these costs, it is generally preferable to avoid intentionally issuing exceptions unless there are no better alternatives.

Some representative exception signals issued by operating systems to define certain events are described in Table 1.

TABLE 1

Exception Signals

| Signal | Description |
|---|---|
| SIGHUP | "Hangup"—commonly used to indicate to a process that its configuration has changed, and that it should re-read its config file. |
| SIGINT | "Interrupt"—usually means Ctrl-C has been pressed by the user. |
| SIGILL | "Illegal Instruction"—the processor generates this when an invalid instruction opcode is encountered. |
| SIGTRAP | "Breakpoint"—often used by debuggers. |
| SIGBUS | "Bus Error"—usually generated by the processor to indicate an invalid memory access. This is usually an access to an unallocated or unaligned memory address. |
| SIGSEGV | "Segmentation Violation"—generated by the processor when a user process has tried to do something not permissible in user mode. For example, trying to execute a privileged instruction, or trying to write to part of the kernel memory would both raise this signal. |
| SIGALRM | "Alarm Clock"—a process can make the alarm( ) system call, which requests the delivery of this signal n seconds later. |
| SIGTERM | "Terminate"—polite request for a program to think about exiting, if it's not too inconvenient. |
| SIGQUIT | "Quit"—Firm request for a program to exit, now please! |
| SIGKILL | "Die"—immediately terminates the process. This signal cannot be intercepted by a signal handler. |

Exception signals can come from two sources: (1) directly from a subject program or (2) from the operating system or another process. Some exception signals are generated as a direct result of an instruction executed by the subject program. For example, if a subject program executes an illegal opcode, then SIGILL is raised. Similarly, if the subject program attempts an illegal memory access then SIGSEGV is raised. These are referred to as in-band signals. Exception signals can also be generated externally, either by the operating system or by another process. SIGHUP and SIGALRM are examples of these. These externally generated exception signals are called out-of-band signals.

From a subject program's point of view, an exception signal can occur at any time. When an exception signal occurs, the operating system interrupts the execution of the signaled program and invokes a signal handler function. The operating system maintains a process-specific function table which maps each signal to a particular signal handler. The operating system also defines default signal handlers for all exceptions. The default signal handlers either take predefined actions or simply ignore the signal.

For example, in Unix, a program can override a default signal handler by invoking the sigaction( ) system call. Sigaction( ) allows the program to specify what action the operating system should take when a particular exception signal is received. The action can be: (1) ignore the exception signal; (2) call the default signal handler; or (3) call a specialized signal handler function, whose address is provided by the program. Other options that can be specified when making the sigaction( ) call include which other signals are blocked during execution of a signal handler, in much the same way as a CPU can mask certain interrupts.

A Unix signal handler can be provided with one of two prototypes. The first signal handler prototype is "void sigHandler(int sigNum)." The first argument is the number of the exception signal, so that one function can be registered to handle multiple signals. A program can request that more information be provided to the signal handler by calling sigaction( ) with the SA_SIGINFO flag. In this case, the Unix signal handler prototype becomes "void sigHandler(int sigNum, siginfo_t sigInfo, void *context)."

The second parameter ("siginfo") is a structure which contains information about the signal, including some indication of what caused the signal and where it came from. For example, in the case of a SIGILL signal, the siginfo structure contains the address of the illegal instruction. This data can be essential to allow the process to handle the signal properly. The third parameter ("context") provides access to the processor state (including all subject registers) at the time the signal was raised. Again, this data can be essential to allow correct handling of a signal. The signal handler is allowed to modify this context; when execution is resumed, the subject registers are then restored to the values of the modified context.

In both embedded and non-embedded CPU's, one finds predominant Instruction Set Architectures (ISAs) for which large bodies of software exist that could be "accelerated" for performance, or "translated" to a myriad of capable processors that could present better cost/performance benefits, provided that they could transparently access the relevant software. One also finds dominant CPU architectures that are locked in time to their ISA, and cannot evolve in performance or market reach. Such architectures would benefit from "Synthetic CPU" co-architecture.

Program code conversion methods and apparatus facilitate such acceleration, translation and co-architecture capabilities and are addressed, for example, in the co-pending patent application, U.S. patent application Ser. No. 10/439,966, filed on May 16, 2003, entitled Block Translation Optimization for Program Code Conversion and assigned to the same assignee as the present application, the disclosure of which is hereby incorporated by reference into the present application. Exception handling is one attribute of many subject programs which may be encountered in the course of program code conversion.

SUMMARY

The following is a summary of various aspects and advantages realizable according to various embodiments according to the invention. It is provided as an introduction to assist those skilled in the art to more rapidly assimilate the detailed design discussion that ensues and does not and is not intended in any way to limit the scope of the claims that are appended hereto.

In particular, the inventors have developed methods directed at expediting program code conversion, particularly useful in connection with a run-time translator which employs translation of subject program code into target code. According to one aspect of the following description, an adjustable precision exception handling technique is providing for handling exceptions encountered during execution of translated subject code at varying levels of precision, depending upon the particular type of exception encountered. As an exception signal is detected by the translator, the state of the subject processor is captured at a level of precision determined to be sufficient for the detected exception and the corresponding signal handling behavior of the subject program.

BRIEF DESCRIPTION OF THE DRAWINGS

The accompanying drawings, which are incorporated in and constitute a part of the specification, illustrate presently preferred implementations and are described as follows:

FIG. 2 is a schematic diagram illustrating a first exception signal handling process.

FIG. 3 is a schematic diagram useful in illustrating exception signal handling processes in accordance with an illustrative embodiment of the invention.

DETAILED DESCRIPTION

Figure 1:
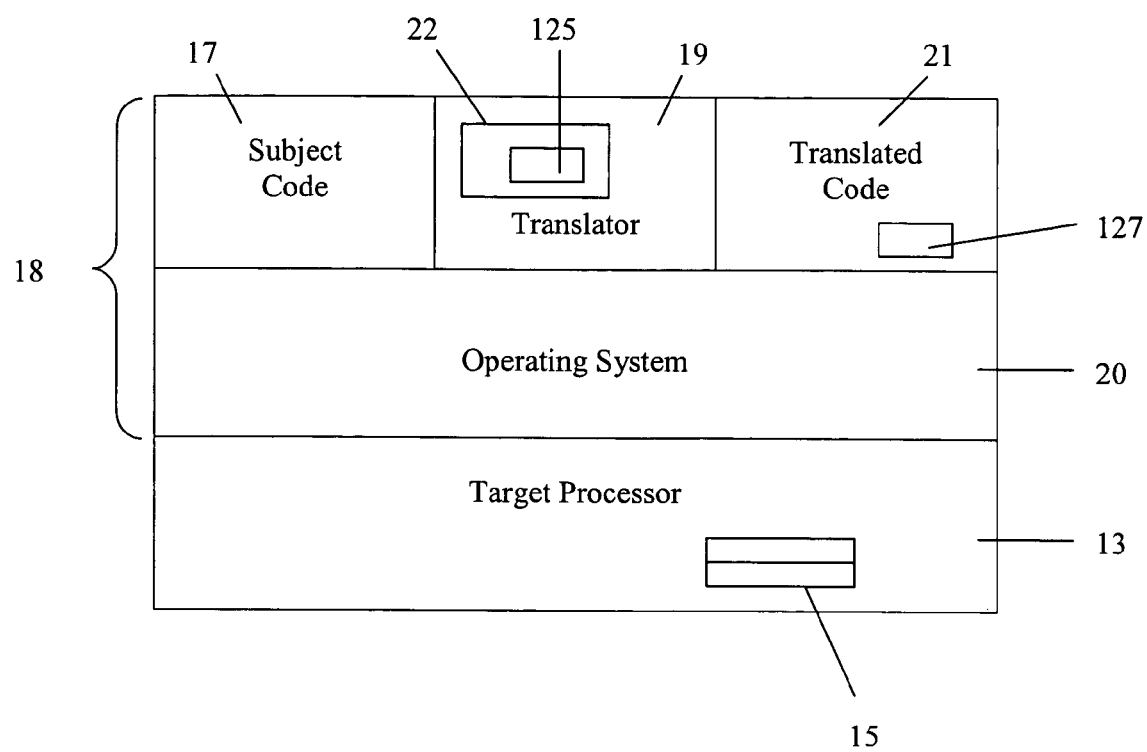
FIG. 1 is a block diagram illustrative of apparatus wherein embodiments of the invention find application.

Illustrative apparatus for implementing various novel features discussed below is shown in FIG. 1. FIG. 1 particularly illustrates a target processor 13 including target registers 15 together with memory 18 storing a number of software components 17, 19, 20, 21 and 22. The software components include subject code 17 to be translated, an operating system 20, the translator code 19, and the translated code 21. The translator code 19 may function, for example, as an emulator translating subject code of one ISA into translated code of another ISA or as an accelerator for translating subject code into translated code, each of the same ISA.

The translator 19 includes a variable precision exception handling mechanism 22, which includes a proxy signal handler 125. As described below, the mechanism 22 registers the proxy signal handler 125 in the target code 21 for exception handling purposes. The translator 19 may also generate a translated subject signal handler 127 for exception signal handling purposes.

The translator 19, i.e., the compiled version of the source code implementing the translator, and the translated code 21, i.e., the translation of the subject code 17 produced by the translator 19, run in conjunction with the operating system 20 such as, for example, UNIX running on the target processor 13, typically a microprocessor or other suitable computer. It will be appreciated that the structure illustrated in FIG. 1 is exemplary only and that, for example, software, methods and processes according to the invention may be implemented in code residing within or beneath an operating system. The subject code, translator code, operating system, and storage mechanisms may each be any of a wide variety of types, as known to those skilled in the art.

In overall operation of apparatus according to the illustrative embodiment of FIG. 1, program code conversion is preferably performed dynamically, at run-time, while the translated code 21 is running. The translator 19 runs inline with the translated program 21. If an exception signal handler is registered by the subject code 17, the translator 19 is designed to translate and execute that exception signal handler on receipt of the corresponding exception signal. In so doing; the translator 19 is designed to correctly emulate the semantics of the subject operating system by keeping track of which respective translated portions of the subject code 17 to execute upon the receipt of the respective exception signals. In addition, the same exception signal may have different signal numbers on different architectures, so that emulation may include translation of signal numbers. The translator 19 is further preferably operable to detect a subject program exception during decoding of the subject code 17. In such case, the translator 19 may then simply invoke the appropriate subject signal handler at the appropriate time rather than raising an actual exception signal.

The translator 19 further populates the siginfo data structure if that data structure is used by the subject signal handler. Likewise, the translator 19 populates the sigcontext data structure if that data structure is used by the subject signal handler. As noted above, the sigcontext data structure contains a snapshot of the subject processor state at the time of the exception signal. Since some signals, such as SIGSEGV, can be raised by almost any instruction, populating the sigcontext structure requires that the translator 19 be able to correctly regenerate the entire subject processor state from an arbitrary point within a block of subject code 17. The ability to recreate the entire subject processor state is referred to as "precise exception handling." Precise exception handling is very difficult for a dynamic translator to support without significant performance losses.

As noted above, in cases where a subject code 17 registers an exception signal handler, the translator 19 is designed to emulate the semantics of that signal handler. In most cases, a subject code exception signal handler is not executable on the target architecture and is not responsive to target exception signals. In order to accommodate this incompatibility, the translator 19 includes a proxy signal handler 125, which the translator 19 registers in the target program 21 when, for example, a system call for a subject system handler is detected in the subject program.

The proxy signal handler 125 is invoked by and intercepts signals from the target operating system 20 and constructs the appropriate subject context which will be needed by the translated signal handler 127. The proxy signal handler 125 then calls the translator 19, which then invokes the appropriate (translated) subject signal handler.

Alternatively, if the translator 19 detects at decode-time that a particular subject code instruction will raise an exception signal, the translator 19 plants target code which constructs the target context (133, FIG. 5) and invokes the proxy signal handler 125 directly. The subject state is again recreated by the proxy signal handler 125 using several sources, including the representation of the subject processor state maintained by the translator 19 and the target processor state (133) passed to the proxy handler 125, as described further below. This "detect at decode-time" approach prevents an actual exception signal from being raised by the target operating system 20, and hence simplifies operation.

FIG. 2 shows the control flow of signal handling which occurs when a program is running on its subject architecture. FIG. 3 shows signal handling for a translated program using the target operating system signal handling mechanism of a present embodiment.

In the signal handling scenario of FIG. 2, signal handling begins when the subject program 101 raises an exception signal 111, which transfers control to the operating system 103. The operating system 103 constructs a context structure 113 which reflects the state of the subject processor when the exception signal 111 occurred. The context structure is then passed to the signal handler 105 that was registered for the particular exception signal 111. When the signal handler 105 completes its operation, the context structure 113' is returned to the operating system 103. The operating system 103 then restores the processor state from the context 113' and returns control to the program 101. Any changes to the context structure 113 (e.g., to a register value) made by the signal handler 105 will be reflected in the processor state when the program 101 resumes execution. In FIG. 2, the apostrophe at the end of the context structure designation "113" indicates that the contents of the context structure may have been modified.

FIG. 3 illustrates the control flow of signal handling in a translated program 21 executed by the target processor 13, using the exception signal handling mechanism 22. To emulate signal handling, the translator 19 first registers a proxy signal handler function 125 for the translated program 121. When an exception signal 131 occurs in the translated program 121, the target operating system 20 invokes the proxy signal handler 125 and passes it the target context 133. The proxy signal handler 125 uses the target context 133 and a subject register bank 141 to construct the subject context 135.

The translator 19 then identifies, translates, and executes the corresponding subject program signal handler 127 using the reconstructed subject state 135. In particular, in the illustrative embodiment, the translator 19 adjusts the subject state of the handler 127 such that, when the handler 127 begins executing, its parameters point to the reconstructed subject state 135. When the subject signal handler 127 completes it operation, the subject context 135' is returned to the proxy signal handler 125. When the proxy signal handler 125 completes its operation, it returns the target context 133' to the target operating system 20. The target operating system 20 then restores the target processor state using the target context 133' and resumes execution of the translated subject code 121.

The subject register bank 141, otherwise referred to as a global register store, is a memory region that is a repository for abstract registers, each of which corresponds to and emulates the value of a particular subject register or other architectural feature. During the execution of translated code 21, abstract register values are stored alternatively in the subject register bank 141 or in target registers 15 (FIG. 1). During the execution of translated code 21, abstract registers are temporarily held in the target registers 15 so that they may participate in instructions. Subject register values are saved in the subject register bank 141 when they are not being held in the target registers 15. For example, if the register allocation for a particular block of subject code requires a subject register value to be spilled (i.e., saved to memory in order to free a target register), the value is spilled to a reserved location within the subject register bank 141 that corresponds to that particular subject register. Likewise, all subject register values are saved back to the subject register bank 141 at the end of each block of subject code, as target register values may be overwritten between successive blocks. The various features associated with creating and using a subject register bank 141 or global register store are described in detail in the aforementioned co-pending patent application, U.S. patent application Ser. No. 10/439,966, filed on May 16, 2003, entitled Block Translation Optimization for Program Code Conversion.

In cases where the translated subject signal handler 127 modifies the subject context 135, the proxy signal handler 125 saves the modified values to the subject register bank 141. In FIG. 3, the apostrophe at the end of subject context designation "135'" indicates that the contents may have been modified. If, at the time the exception signal was raised, any of those subject register values were live in target registers, the proxy signal handler 125 also updates the corresponding entries in the target context 133. In FIG. 1, the apostrophe at the end of target context designator "133'" again indicates that the contents may have been modified.

As discussed in greater detail hereafter, depending on the level of precision required by the subject signal handler 127, the translator 19 may plant target code immediately preceding an instruction which raises an exception, which target code rectifies and spills all subject register values to the subject register bank 141. This guarantees that the values retrieved from the subject register bank 141 by the proxy signal handler 125 are accurate, and that the subject context 135 passed to the translated subject signal handler 127 is accurate.

Figures 4, 5:
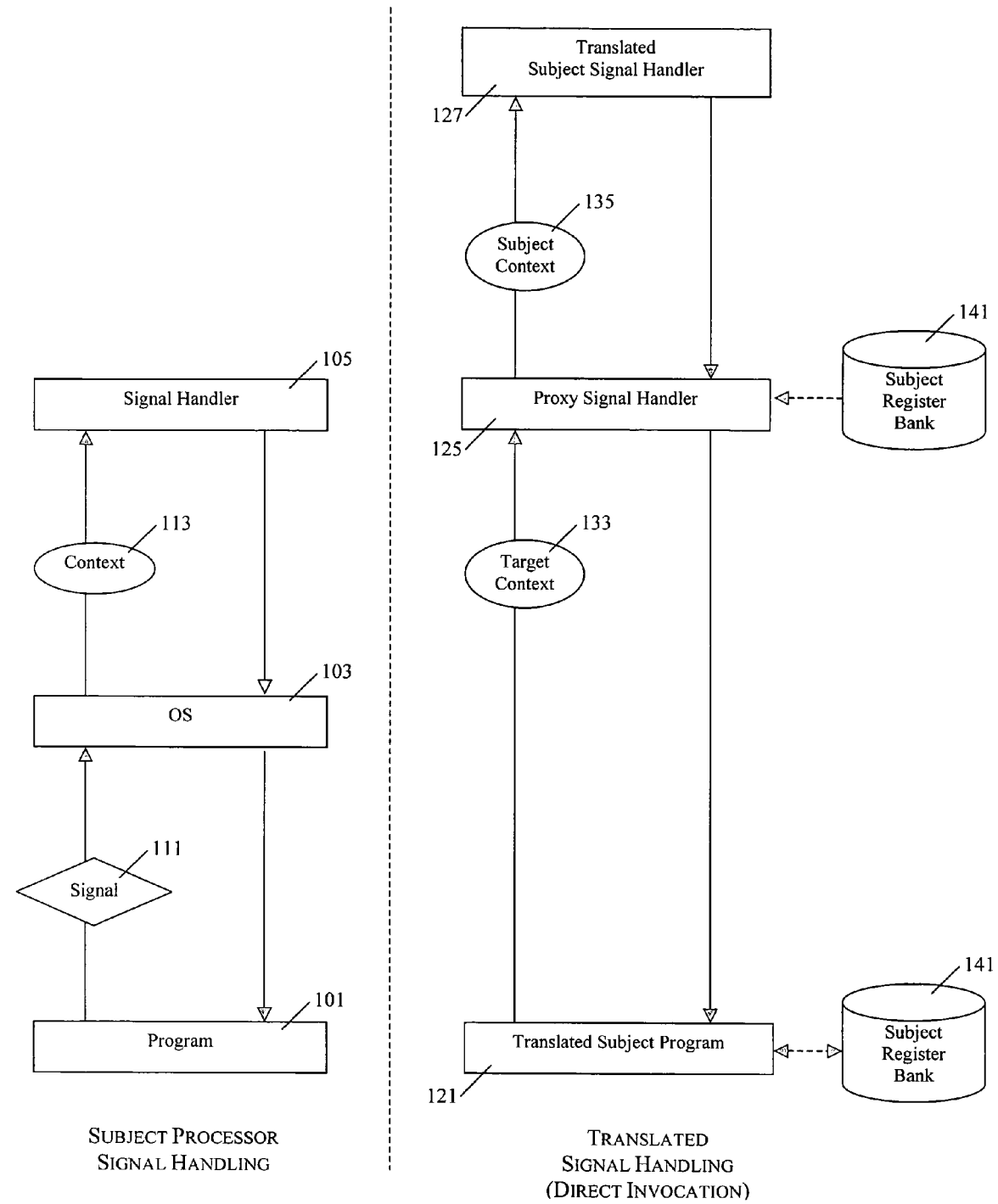
FIG. 4 is a schematic diagram illustrating a second exception signal handling process.
FIG. 5 is a schematic diagram useful in illustrating an exception signal handling process in accordance with an illustrative embodiment of the invention.

FIG. 4 illustrates signal handling when a program is running on its subject architecture in the case where the signal handler 105 does not modify the subject context 113. In the subject architecture signal handling scenario of FIG. 4, signal handling begins when the subject program 101 raises an exception signal 111, which transfers control to the operating system 103. The operating system 103 constructs a context structure 113 which reflects the state of the processor when the exception the signal 111 occurred. The context structure 113 is then passed to the signal handler 105 that was registered for the particular exception signal 111. When the signal handler 105 completes it operation, it returns control to the operating system 103. The operating system 103 then returns control to the program 101.

FIG. 5 illustrates the control flow of signal handling for a translated program 121, using direct invocation of the proxy signal handler 125 by target code, and in which the translated subject signal handler 127 does not modify the subject context 135. At the point in the translated program 121 where the exception signal would have occurred, the target code 21 constructs a target context 133 and invokes the proxy signal handler 125, passing it the target context 133. The proxy signal handler 125 uses the target context 133 and the subject register bank 141 to construct the subject state 135 as a subject context structure. The translator 19 then identifies, translates, and executes the corresponding subject program signal handler 127, again using the reconstructed subject context (state) 135. When the subject signal handler 127 completes its operation, it returns control to the proxy signal handler 125. When the proxy signal handler completes its operation, it returns control to the translated subject code 121, which resumes execution.

As noted above, recreating the subject processor state can be both difficult and expensive. First, there is an actual cost associated with calculating and collecting the subject state. For example, translator optimizations such as lazy evaluation may postpone the calculation of subject register values by storing the underlying data necessary to calculate those values. Recreating the subject state in response to a signal requires those values to be rectified (i.e., calculated) immediately. Even if the subject registers have been calculated previously, they must be retrieved from memory, such as from a subject register bank.

Second, there is an opportunity cost associated with the capability of calculating the subject state at any point in the subject program. Many key optimizations in a dynamic binary translator involve departures from a strict model of binary compatibility. Binary compatibility means that the translator can recreate the exact state of the subject architecture. A strict model is one in which the subject state can be recreated at any point in the translated program (i.e., at any subject instruction). In order to preserve the information necessary to recreate the subject state at any point in execution, the translator must forego significant optimizations. When those optimizations are in use, the translator has no way to recreate the subject context accurately. Thus, the real cost of exceptions is not generating the state when the exception occurs but being able to generate the state at all.

To address such concerns, the preferred translator 19 emulates exceptions using a variable precision exception handling mechanism 22, whereby the subject context, e.g., 135, is reconstructed at different levels of detail for different exceptions, depending on the requirements of the particular exception. The translator 19 detects subject exceptions either at decode-time or when encountered during translation, determines the precision required for the subject context for a particular exception, and sets an appropriate flag. Generally, the translator 19 can determine at decode-time what level of precision is required. By comparison, a naïve translator is inefficient and would implement the most conservative solution to allow for the possibility that a complete and precise subject context might be needed at any point.

In one embodiment, the variable precision exception handling mechanism 22 provides exception handling at four levels of subject context precision: (0) no state; (1) the last known consistent stack frame; (2) precise program counter; and (3) full rectified subject registers. As noted, the cost of rectifying all subject registers is very high and is therefore avoided if at all possible. Therefore, the translator 19 handles each exception at the lowest level of precision necessary. While this embodiment of the variable precision exception handling mechanism 22 describes four levels of subject context precision, it is possible for the variable precision exception handling mechanism 22 to select any level of precision from any number of possible levels of precision. Furthermore, the particular components of the subject context being captured for each level of precision can also be variably selected.

Table 2 illustrates the operations performed by different translator components for each of the four exception handling precision levels, LEVEL 0 through LEVEL 3, for the illustrative embodiment. The particular operations for each level are described in further detail below.

TABLE 2

Variable Precision Exception Handling

| | Level 0 | Level 1 (Default) | Level 2 | Level 3 |
|---|---|---|---|---|
| Decoding | — | — | save PC | save PC |
| | — | — | — | rectify/spill (IR) |
| Target Code | — | — | — | rectify subj regs |
| | — | — | — | spill subj regs |
| | exception | exception | exception | exception |
| Proxy Signal Handler | — | load PC (vague) | load PC (precise) | load PC (precise) |
| | — | load stack frame (vague) | load stack frame (vague) | load subj regs (precise) |
| | translate/invoke subject handler | translate/invoke subject handler | translate/invoke subject handler | translate/invoke subject handler |
| | — | — | — | save subj regs |
| | — | — | — | modify target regs |

Level Zero: No State

In some cases, the translator 19 determines that no subject state is necessary to handle an exception. In these cases, the subject context 135 passed to the translated signal handler 127 need not contain any accurate processor state data. For example, in the Linux operating system, exception signal number 31 is reserved for the "Pthread" threading library. This signal is sent from a newly created child thread to its parent to signify successful creation. The implementation of the Pthread library indicates that the handler 127 requires no state whatsoever, rather, the act of delivering of the exception itself is the only data required.

Level One: Last Known Stack Frame

Another level of precision is to provide the last known stack frame, meaning the last known consistent values of the stack pointer, base pointer, and program counter (PC) registers. In most situations, it is most efficient to make the last known stack frame the default level of precision. The remaining, undefined values in the subject context 135 are filled in with a special value, such as "0xdeadbeef," for debugging purposes.

These values are imprecise in that they demonstrate the last known consistent state of the subject program and may not precisely reflect the current state. In one embodiment of the translator 19, the last known consistent state corresponds to the last basic block boundary, as generally all subject registers are rectified and saved to the subject register bank between basic blocks. The "last known stack frame" level of precision requires no rectification of subject register values.

Level Two: Precise Program Counter

Level 2 precision is applied in cases where the translator 19 determines at decode-time that (a) a particular subject instruction will trigger an exception signal and (b) the subject signal handler will require a precise program counter value. For example, on the x86 processor, the IRET instruction can only be executed at certain privilege levels; if the translator 19 encounters this instruction at a time when the subject privilege level is too low, proper emulation requires that the corresponding subject signal handler be invoked, and that the signal handler be passed a precise value for the subject program counter.

The translator 19 emulates such instructions by intentionally raising the correct exception or by invoking the subject signal handler directly at the appropriate location. During translation, the translator 19 records the subject address of the instruction that will cause the exception in a temporary abstract register. The translator 19 also sets a flag to indicate the exception handling precision level, so that the proxy signal handler 125 will know how much context to construct when it is subsequently invoked. In case of Level Two, a "precise program counter" flag tells the proxy signal handler 125 to retrieve the precise program counter value. The translator 19 then plants target code to raise the appropriate exception (normally SIGILL on Unix systems including Linux) or to invoke the subject signal handler 127 directly. When the proxy signal handler 125 is invoked, it detects that the "precise program counter" flag is set and retrieves the program counter value PC from its stored location.

Level Three: Precise Subject Registers

Level 3, the highest precision level of the embodiment under discussion, is used where the translator 19 detects at decode time that an instruction will cause an exception and will require context beyond the value of the program counter PC. In some cases, the translator 19 determines at decode-time that a particular instruction in the subject code 17 will cause an exception and that the exception handling will require some state beyond the program counter. In this case, at decode-time, the translator 19 both records the precise program counter value PC (subject address) of the excepted instruction and generates code to force all subject register values to be rectified prior to the excepted instruction. This allows the translator 19 to generate the full subject context when the exception is raised. In addition, in a system operating in a block translation mode, the translator 19 marks the block of code containing the exception such that, during code generation, certain optimizations are not applied. In other words, some optimizations involving code motion can cause the subject register values to be temporarily (i.e., at certain points in the target code) inconsistent with the subject state even if rectified; these optimizations are turned off for blocks that contain exceptions, to guarantee the accuracy of the subject state passed to the translated subject signal handler 127.

For example, the x86 INB instruction is used by some subject programs to emulate hardware accesses. The subject exception signal handler in this case requires precise values for all subject registers (i.e., the full context). When an x86 INB instruction is encountered during translation (decoding), the translator 19 inserts target code (or IR, which is later emitted as target code) to rectify all lazy or pending subject register values and then spill them to the subject register bank 141. The translated block will thus comprise rectification code, spill code, and an exception-raising target instruction. During the subsequent execution of the translated block, the subject state is rectified and spilled before the exception is raised, such that the values in the subject register bank 141 are consistent and accurate when the proxy signal handler 125 is invoked.

The proxy signal handler 125 constructs the subject context 135 using the rectified values in the subject register bank 141, and constructs the siginfo structure from the stored address of the instruction that raised the signal. The proxy signal handler 125 then translates the subject signal handler 127 and invokes it with the siginfo structure and context structures 135. When the subject signal handler 127 finishes execution, it returns control to the proxy signal handler 125. When the proxy signal handler 125 finishes execution, control returns to the translated program 121.

In rare cases, the subject signal handler 127 modifies some of the subject registers in the context structure 135. In this case, the proxy signal handler 125 copies those modified values back into the subject register bank 141 prior to returning control. This ensures that any modified subject register values are propagated into the translated program 121. An example of such a case would be a subject signal handler which detects all "divide-by-zero" exceptions and responds by setting the result to zero and jumping over the "divide" instruction.

In the illustrative embodiment, the translator 19 determines the level of precision based on the source of the exception signal, the signal number and the particular operating system 21 being used. In this context, there are three "sources" of exception signals (1) detected at decode time (2) caused by execution of target code and (3) caused by an external event. In the illustrative embodiment, external events including asynchronous external events are always assigned a default level of LEVEL 1. LEVEL 1 also serves as a default level of handling for sources (1) and (2).

Regardless of the precision level used, if the exception signal is the result of a memory access, the translator 19 also fills in the corresponding subject address that caused the exception. This value is derived from the target state passed to the proxy handler 125, or encoded in the target code which invokes the subject signal handler 127. Depending on the memory models of the subject code 17 and target code 21, the translator 19 may need to demangle the target address of the memory access to obtain the corresponding subject address.

Those skilled in the art will appreciate that various adaptations and modifications of the just-described embodiments can be configured without departing from the scope and spirit of the invention. Therefore, it is to be understood that, within the scope of the appended claims, the invention may be practiced other than as specifically described herein.

What is claimed:

1. A method of handling exceptions encountered during the translation of subject program code into target code, comprising:

detecting the occurrence of an exception;

selecting a level of subject context precision required for the detected exception from a plurality of possible levels of precision, wherein one of said possible levels of subject context precision is a precise subject register state including rectified subject registers and a precise program counter value; and invoking a signal handler to handle the detected exception using the selected level of precision, wherein the selected level of subject context precision comprises either:
(a) a precise subject register state including the rectified subject registers and the precise program counter value; or
(b) a level in which less than an entire subject processor state is passed to the signal handler, and
wherein in case (b), the selected level of subject context precision that is passed to the signal handler comprises one or more of (i) a last known stack frame, (ii) no subject processor state and (iii) a precise program counter value.

2. The method of claim 1, wherein the exception occurrence detecting step detects the occurrence of an exception signal during translation of the subject program code.

3. The method of claim 2, wherein the target code generated by the translation invokes a proxy signal handler to handle the detected exception.

4. The method of claim 1, wherein the exception occurrence detecting step detects the occurrence of an exception signal during execution of the target code.

5. The method of claim 4, wherein a target operating system invokes a proxy signal handler to handle the detected exception.

6. The method of claim 1, wherein the default level of subject context precision is a last known stack frame.

7. The method of claim 6, wherein the last known stack frame includes a last known stack pointer value, a base pointer value, and a program counter register value.

8. The method of claim 7, wherein said default level of subject context precision requires no rectification of subject register values.

9. A translation system comprising:
a memory;
a processor coupled to the memory and operable to:
detect the occurrence of an exception;
select a level of subject context precision required for the detected exception from a plurality of possible levels of precision, wherein one of said possible levels of subject context precision is a precise subject register state including rectified subject registers and a precise program counter value; and
invoke a signal handler to handle the detected exception using the selected level of precision, wherein the selected level of subject context precision comprises either:
(a) a precise subject register state including the rectified subject registers and the precise program counter value; or
(b) a level in which less than an entire subject processor state is passed to the signal handler, and
wherein in case (b), the selected level of subject context precision that is passed to the signal handler comprises one or more of (i) a last known stack frame, (ii) no subject processor state, and (iii) a precise program counter value.

10. The method of claim 9 wherein said step of reconstructing a subject context comprises selecting one of a plurality of subject context precision levels for processing said exception.

11. The method of claim 10 wherein said step of reconstructing a subject context is performed by proxy signal handler code.

12. The method of claim 11 wherein said proxy signal handler code is registered in the target code by said translator and wherein said translator further raises a flag to said proxy signal handler indicating which of said plurality of subject context precision levels is to be used in response to said particular exception.

13. The method of claim 11 wherein said particular exception is detected during decoding of the subject code by said translator.

14. The method of claim 13 wherein said translator responds to detection of said particular exception during decoding to plant target code which generates said target context and invokes operation of the proxy signal handler code.

15. The method of claim 11 wherein said particular exception arises during execution of said target code.

16. The method of claim 15 wherein a target operating system responds to occurrence of said particular exception during execution of said target code to pass target context to said proxy signal handler code.

17. The method of claim 16 wherein, after receiving said target context, said proxy signal handler code calls the translator, which then invokes a selected translated subject signal handler.

18. The method of claim 10 wherein said exception is caused by one of a plurality of asynchronous external events and wherein said exception is handled using a selected default level of precision assigned to all asynchronous events.

19. The method of claim 18 wherein said selected default level is a last known stack frame.

20. The method of claim 11 wherein said proxy signal handler code is arranged to interact with a subject register bank.

21. A apparatus for handling exceptions encountered during the translation of subject program code into target code, comprising: software encoded on a computer storage medium and operable to:
detect the occurrence of an exception;
select a level of subject context precision required for the detected exception from a plurality of possible levels of precision, wherein one of said possible levels of subject context precision is a precise subject register state including rectified subject registers and a precise program counter value; and
invoke a signal handler to handle the detected exception using the selected level of precision, wherein the selected level of subject context precision is passed to the signal handler and comprises either;
(a) a precise subject register state including the rectified subject registers and the precise program counter value; or
(b) a level in which less than an entire subject processor state is passed to the signal handler, and
wherein in case (b), the selected level of subject context precision that is passed to the signal handler comprises one or more of (i) a last known stack frame, (ii) no subject processor state and (iii) a precise program counter value.

* * * * *